United States Patent
Mizuguchi

(10) Patent No.: US 8,588,841 B2
(45) Date of Patent: Nov. 19, 2013

(54) BASE STATION APPARATUS, EDGE USER ESTIMATION METHOD, AND PROGRAM

(75) Inventor: Hironori Mizuguchi, Tokyo (JP)

(73) Assignee: NEC Corporation, Tokyo (JP)

(*) Notice: Subject to any disclaimer, the term of this patent is extended or adjusted under 35 U.S.C. 154(b) by 53 days.

(21) Appl. No.: 13/375,500

(22) PCT Filed: Jun. 3, 2010

(86) PCT No.: PCT/JP2010/003705
§ 371 (c)(1),
(2), (4) Date: Dec. 1, 2011

(87) PCT Pub. No.: WO2010/140366
PCT Pub. Date: Dec. 9, 2010

(65) Prior Publication Data
US 2012/0071176 A1    Mar. 22, 2012

(30) Foreign Application Priority Data

Jun. 3, 2009    (JP) .............................. P2009-134168

(51) Int. Cl.
*H04B 7/00*        (2006.01)
(52) U.S. Cl.
USPC ............ 455/522; 455/69; 455/70; 455/67.11; 455/436; 455/456.5
(58) Field of Classification Search
USPC ........ 455/561, 522, 69, 450–452.2, 436–442, 455/67.11–67.16, 421–425; 370/331, 329
See application file for complete search history.

(56) References Cited

U.S. PATENT DOCUMENTS

| | | | | |
|---|---|---|---|---|
| 6,473,614 B1* | 10/2002 | Quensel et al. | ............... | 455/436 |
| 6,539,206 B1* | 3/2003 | Min et al. | ....................... | 455/522 |
| 7,996,032 B2* | 8/2011 | Malladi et al. | ................ | 455/522 |
| 8,068,868 B2* | 11/2011 | Chen et al. | ..................... | 455/522 |

(Continued)

FOREIGN PATENT DOCUMENTS

| | | |
|---|---|---|
| JP | 2006174436 A | 6/2006 |
| JP | 2007258844 A | 10/2007 |
| WO | 2008007437 A | 1/2008 |

OTHER PUBLICATIONS

International Search Report for PCT/JP2010/003705 mailed Sep. 7, 2010.

(Continued)

*Primary Examiner* — Sharad Rampuria

(57) ABSTRACT

A base station apparatus that estimates whether or not each terminal device belonging to a communication cell of the present apparatus is present in an end area of the cell. The apparatus includes a reception device that receives from each terminal device, transmission power information which indicates transmission power of the terminal device; a registration device that successively registers the transmission power information with a storage device; a statistical processing device that computes a statistic used for estimating the terminal device present in the end area of the communication cell, with respect to a population which is the transmission power information stored in the storage device; a candidate extraction device that extracts candidates for the terminal device present in the end area of the communication cell, based on the statistic computed by the statistical processing device; and an estimation device that estimates the terminal device present in the end area of the communication cell from among the candidates extracted by the candidate extraction device.

10 Claims, 2 Drawing Sheets

(56) References Cited

U.S. PATENT DOCUMENTS

| | | | |
|---|---|---|---|
| 8,351,359 B2* | 1/2013 | Heo et al. | 370/310 |
| 2008/0095263 A1* | 4/2008 | Xu et al. | 375/295 |
| 2009/0191910 A1* | 7/2009 | Athalye et al. | 455/522 |
| 2009/0245191 A1* | 10/2009 | Ball et al. | 370/329 |
| 2010/0113059 A1* | 5/2010 | Morimoto et al. | 455/452.2 |
| 2010/0120446 A1* | 5/2010 | Gaal | 455/452.2 |
| 2010/0158147 A1* | 6/2010 | Zhang et al. | 375/260 |
| 2010/0291963 A1* | 11/2010 | Patel et al. | 455/522 |
| 2011/0158117 A1* | 6/2011 | Ho et al. | 370/252 |
| 2011/0207415 A1* | 8/2011 | Luo et al. | 455/68 |
| 2011/0319112 A1* | 12/2011 | Jeong et al. | 455/509 |

OTHER PUBLICATIONS

"Mobile WiMAX—Part I: A Technical Overview and Performance Evaluation", WiMAX Forum, Mar. 2006.

* cited by examiner

BASE STATION APPARATUS, EDGE USER ESTIMATION METHOD, AND PROGRAM

TECHNICAL FIELD

The present invention relates to a base station apparatus, an edge user estimation method, and a program, so as to estimate whether or not a terminal device, which belongs to the cell (i.e., communication area) of the present apparatus, is present in an end area of the cell.

Priority is claimed on Japanese Patent Application No. 2009-134168, filed Jun. 3, 2009, the contents of which are incorporated herein by reference.

BACKGROUND ART

In known mobile communication systems, when a terminal device (called an "edge user") which is present in an end area of the cell of a base station apparatus, transmits information to the base station apparatus, the terminal device must perform the transmission by using higher electric power in comparison with a terminal device present in a central area of the cell of the base station apparatus. However, information transmission from a terminal device as an edge user may occur interference with a cell adjacent to the cell to which the relevant terminal device belongs.

In order to solve such a problem, it is effective to perform a high-speed transmission power control, as defined in a W-CDMA (Wideband Code Division Multiple Access). However, a standard called "LTE" does not employ such a high-speed transmission power control.

Therefore, a technique such as FFR (Fractional Frequency Reuse) is effective which allocates an individual frequency band to each edge user belonging to a different cell, thereby preventing interference between adjacent cells (see, for example, Non-Patent Document 1).

That is, in FFR, when a terminal device is present in a central area of a cell, any of the entire band which can be allocated to the terminal device is allocated the terminal device, and when the terminal device is present in an end area of a cell, the terminal device and an adjacent cell share a band to be used. Therefore, when employing FFR, it is necessary for the base station apparatus to estimate whether or not each terminal device is an edge user.

In a generally known method of estimating whether or not a terminal device is an edge user, the terminal device measures reception power from the base station apparatus. When the measured value is lower than a predetermined threshold, it is estimated that the terminal device is present in an end area of the relevant cell. When the measured value is higher than or equal to the threshold, it is estimated that the terminal device is present in a central area of the cell.

In addition, Patent Document 1 discloses a method of estimating whether or not a terminal device is an edge user, and performing wireless resource allocation based on the estimated result.

PRIOR ART DOCUMENT

Patent Document

Patent Document 1: Japanese Unexamined Patent Application, First Publication No. 2006-174436.

Non-Patent Document

Non-Patent Document 1: "Mobile WiMAX—Part 1: A Technical Overview and Performance Evaluation", WiMAX Forum, March, 2006.

DISCLOSURE OF INVENTION

Problem to be Solved by the Invention

However, the transmission environment for each wireless communication system depends on, not only the distance from the base station apparatus, but also existing buildings or geographical features. Therefore, each terminal device having a low reception power from the base station apparatus is not always present in an end area of the cell. Accordingly, the above-described estimation method often produces erroneous determination.

If erroneous determination for the edge user occurs in FFR, a band, which can originally be allocated to terminal devices in a central area of the cell, is limited needlessly, which causes a decrease in the throughput of the relevant system.

In light of the above circumstances, an object of the present invention is to provide a base station apparatus that estimates whether or not each terminal device belonging to the cell of the present apparatus is an edge user, more accurately in comparison with conventional apparatuses.

Means for Solving the Problem

In order to achieve the above object, the present invention provides a base station apparatus that estimates whether or not each terminal device belonging to a communication cell of the present apparatus is present in an end area of the cell, wherein the apparatus comprises:

a reception device that receives from each terminal device, transmission power information which indicates transmission power of the terminal device;

a registration device that successively registers the transmission power information with a storage device;

a statistical processing device that computes a statistic used for estimating the terminal device present in the end area of the communication cell, with respect to a population which is the transmission power information stored in the storage device;

a candidate extraction device that extracts candidates for the terminal device present in the end area of the communication cell, based on the statistic computed by the statistical processing device; and an estimation device that estimates the terminal device present in the end area of the communication cell from among the candidates extracted by the candidate extraction device.

The present invention also provides an edge user estimation method using a base station apparatus, which estimates whether or not each terminal device belonging to a communication cell of the present apparatus is an edge user present in an end area of the cell, wherein:

a reception device receives from each terminal device, transmission power information which indicates transmission power of the terminal device;

a registration device successively registers the transmission power information with a storage device;

a statistical processing device computes a statistic used for estimating the terminal device present in the end area of the communication cell, with respect to a population which is the transmission power information stored in the storage device;

a candidate extraction device extracts candidates for the terminal device present in the end area of the communication cell, based on the statistic computed by the statistical processing device; and an estimation device estimates the edge user from among the candidates extracted by the candidate extraction device.

The present invention also provides a program that makes a base station apparatus, which estimates whether or not each terminal device belonging to a communication cell of the present apparatus is present in an end area of the cell, operate as:

a reception device that receives from each terminal device, transmission power information which indicates transmission power of the terminal device;

a registration device that successively registers the transmission power information with a storage device;

a statistical processing device that computes a statistic used for estimating the terminal device present in the end area of the communication cell, with respect to a population which is the transmission power information stored in the storage device;

a candidate extraction device that extracts candidates for the terminal device present in the end area of the communication cell, based on the statistic computed by the statistical processing device; and an estimation device that estimates the terminal device present in the end area of the communication cell from among the candidates extracted by the candidate extraction device.

Effect of the Invention

In accordance with the present invention, the registration device successively registers the transmission power information with a storage device, and the estimation device estimates each edge user based on statistics for a population which is the transmission power information stored in the storage device. Therefore, it is possible to reduce the influence of a temporary variation in the transmission power of each terminal device due to the transmission environment. In addition, the edge user estimation based on the statistics can reduce erroneous determination for the edge user.

MODE FOR CARRYING OUT THE INVENTION

Below, an embodiment of the present invention will be explained with reference to the drawings.

Figure 1:
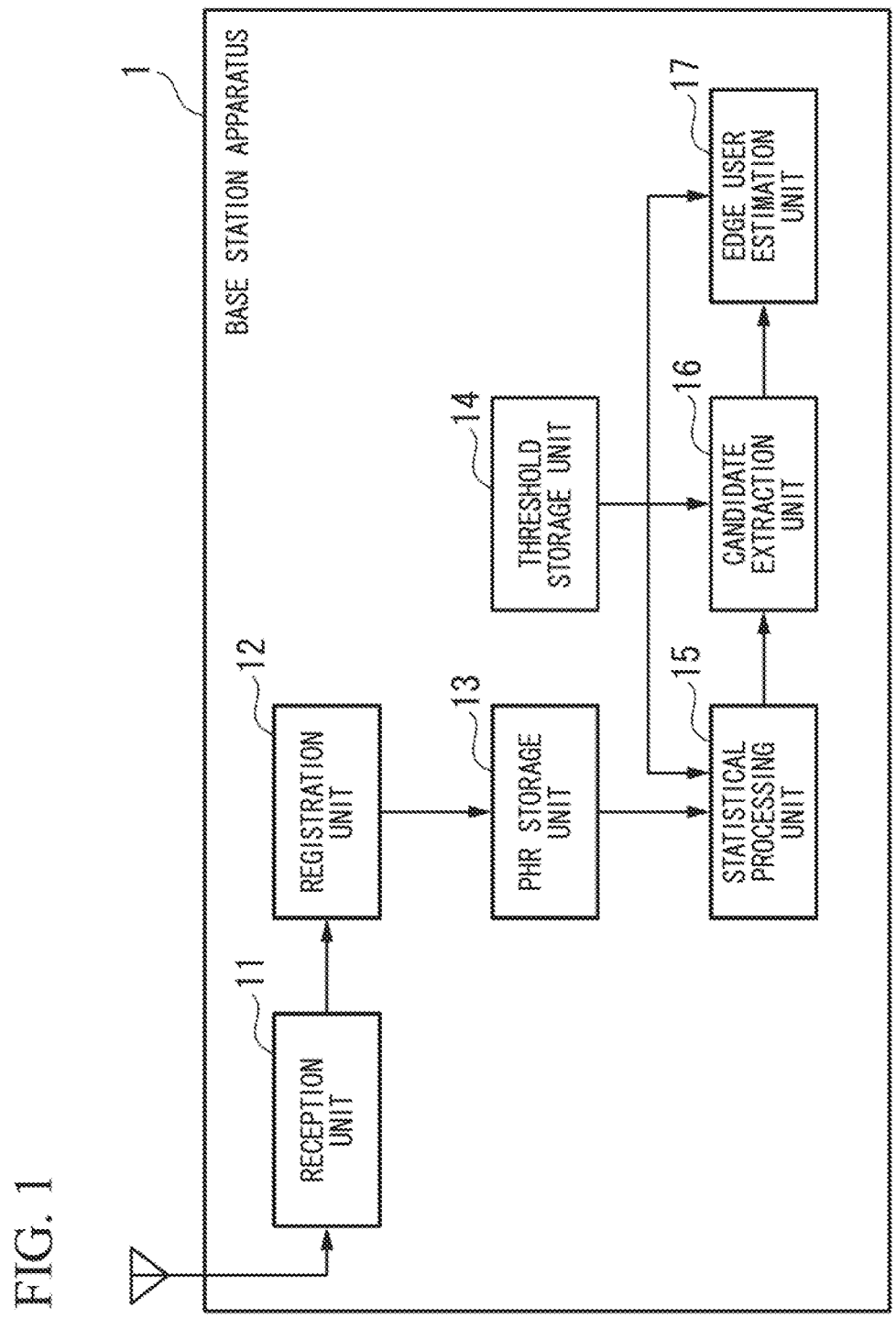
FIG. 1 is a general block diagram showing the structure of a base station apparatus as an embodiment of the present invention.

FIG. 1 is a general block diagram showing the structure of a base station apparatus as an embodiment of the present invention.

The base station apparatus 1 has a reception unit 11, a registration unit 12, a PHR storage unit 13, a threshold storage unit 14, a statistical processing unit 15, a candidate extraction unit 16, and an edge user estimation unit 17.

The reception unit 11 receives PHR (Power Headroom Report) information (i.e., transmission power information) from a terminal device. The PHR information indicates a difference between currently transmitted power and the maximum transmission power of the terminal device, and thus indicates that the smaller the PHR of the terminal device, the closer the power of the current transmission from the terminal device is to the maximum transmission power thereof. The transmission format, interval, or the like for PHR is standardized in the technical specification "3GPP TS36.321" of 3GPP.

The registration unit 12 successively registers the PHR information received by the reception unit 11 with the PHR storage unit 13 in a manner such that the PHR information of each terminal device is identified.

The PHR storage unit 13 stores the PHR information received from each terminal device.

The threshold storage unit 14 stores thresholds used in statistical processing of the statistical processing unit 15; extraction processing of the candidate extraction unit 16; and; estimation processing of the edge user estimation unit 17. The thresholds stored in the threshold storage unit 14 may be designated by an external (superior) apparatus by using an RRC (Radio Resource Control) message or the like, so that each base station apparatus has individual thresholds.

The statistical processing unit 15 computes a statistic for the PHR (information stored in the PHR storage unit 13) as a population.

The candidate extraction unit 16 extracts candidates for the edge user based on the statistic computed by the statistical processing unit 15.

The edge user estimation unit 17 estimates the edge user based on the candidates selected by the candidate extraction unit 16.

In the above structure, the reception unit 11 of the base station apparatus 1 receives the PHR information from each terminal device, which relates to the transmission power of the terminal device. The registration unit 12 successively registers the PHR information received by the reception unit 11 with the PHR storage unit 13. The statistical processing unit 15 computes a statistic for the PHR as a population, and the candidate extraction unit 16 extracts candidates for a terminal device present in an end area of the relevant cell, based on the statistic computed by the statistical processing unit 15. The edge user estimation unit 17 estimates the edge user from among the candidates extracted by the candidate extraction unit 16.

Accordingly, the base station apparatus 1 estimates whether or not the terminal device is an edge user, with a high accuracy.

Below, the operation of the base station apparatus 1 will be explained.

Figure 2:
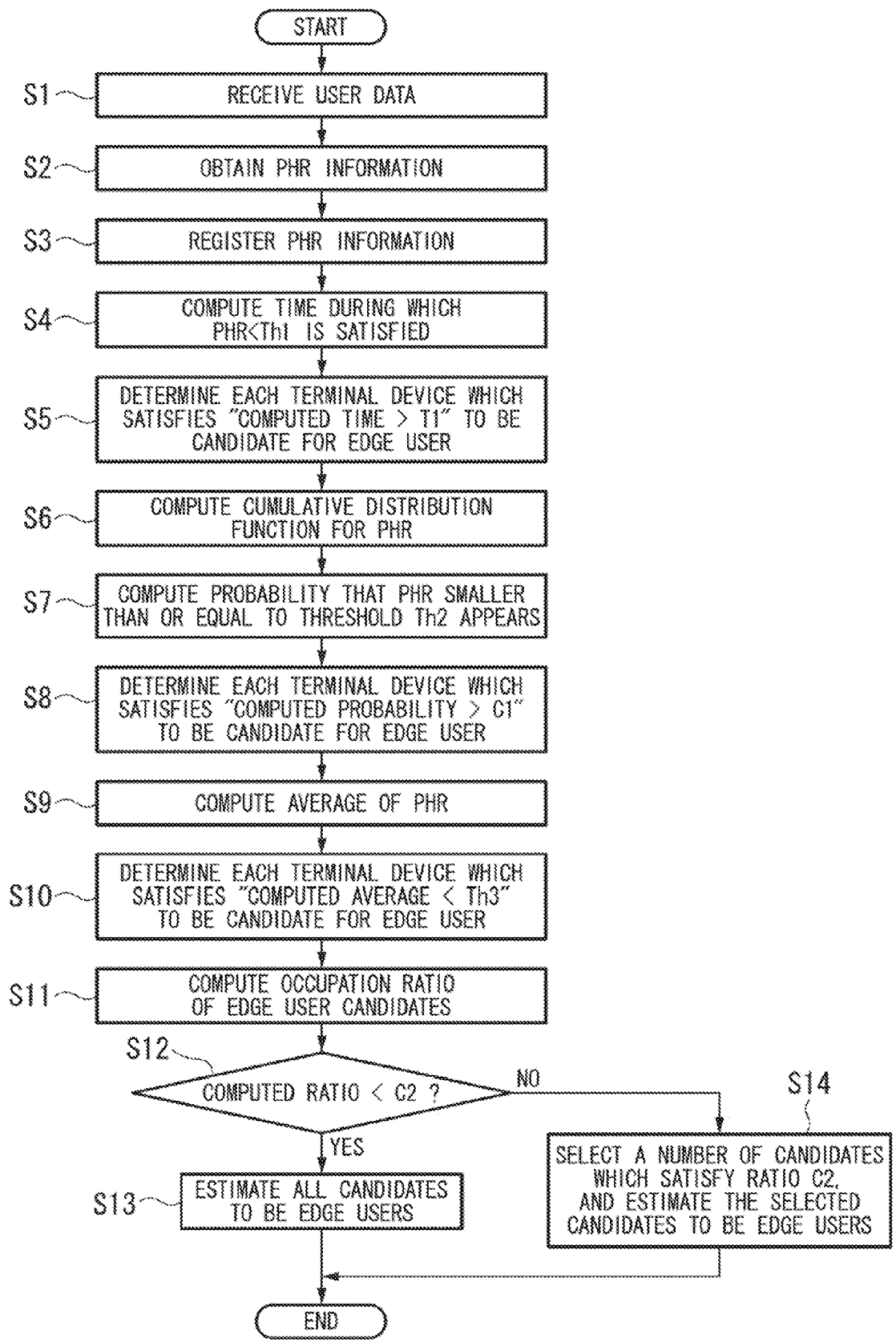
FIG. 2 is a flowchart showing the operation of the base station apparatus.

FIG. 2 is a flowchart showing the operation of the base station apparatus.

First, when each portable terminal sends user data which includes PHR based on a predetermined transmission interval, the reception unit 11 of the base station apparatus 1 received the user data from the portable terminal (see step S1).

Next, the reception unit 11 decodes the received user data, so as to obtain the PHR information (see step S2).

After the reception unit 11 obtains the PHR information, the registration unit 12 registers the obtained PHR information with the PHR storage unit 13 (see step S3).

Next, the statistical processing unit 15 defines a population consisting of the PHR information stored time-series-sequentially in the PHR storage unit 13, and computes a time during which the PHR is smaller than a threshold Th1 stored in the threshold storage unit 14 (see step S4).

The threshold Th1 is used for determining, if being smaller than it, that the transmission is being performed with a power close to the maximum transmission power. The time during which the PHR is smaller than the threshold Th1 may be computed by counting the number of time-series-sequential PHR information items (from among the PHR information stored in the PHR storage unit 13) which are smaller than the threshold Th1.

After the statistical processing unit 15 computes the time during which the PHR is smaller than the threshold Th1, the candidate extraction unit 16 extracts each terminal device as a candidate for the edge user, for which the time computed by the statistical processing unit 15 is longer than a time T1 stored in the threshold storage unit 14 (see step S5).

Here, time T1 is a threshold for determining, if the computed time is longer than T1, that the accumulated time during which transmission is performed with a power close to the maximum transmission power is long.

Next, the statistical processing unit 15 defines a population consisting of the PHR information stored time-series-sequentially in the PHR storage unit 13, and computes a cumulative distribution function which indicates a relationship between each PHR (value) and a probability that PHR information smaller than or equal to the relevant PHR value appears (see step S6).

Based on the computed cumulative distribution function, the statistical processing unit 15 computes a probability that PHR information smaller than or equal to a threshold Th2 (stored in the threshold storage unit 14) appears (see step S7). The threshold Th2 is used for determining, if being smaller than or equal to it, that the current transmission is being performed with a power close to the maximum transmission power.

After the statistical processing unit 15 computes the probability that PHR information smaller than the threshold Th2, the candidate extraction unit 16 extracts each terminal device as a candidate for the edge user, for which the probability computed by the statistical processing unit 15 is higher than a probability C1 stored in the threshold storage unit 14 (see step S8).

Here, probability C1 is a threshold for determining, if the computed probability is higher than C1, that the probability that the current transmission is being performed with a power close to the maximum transmission power is high.

Next, for the PHR information stored time-series-sequentially in the PHR storage unit 13, the statistical processing unit 15 computes an average of the PHR information as a population during time T2 which is stored in the threshold storage unit 14 (see step S9).

After the statistical processing unit 15 computes the average of the PHR information, the candidate extraction unit 16 extracts each terminal device as a candidate for the edge user, for which the average computed by the statistical processing unit 15 is smaller than a threshold Th3 stored in the threshold storage unit 14 (see step S10).

Here, threshold Th3 is used for determining, if the average is smaller than it, that the transmission is performed with a power close to the maximum transmission power.

After the candidate extraction unit 16 extracts the candidates for the edge user through steps S5, S8, and S10, the edge user estimation unit 17 computes an occupation ratio of the candidates (extracted by the candidate extraction unit 16) to the terminal devices which currently belong to the relevant cell (see step S11).

The edge user estimation unit 17 then determines whether or not the computed ratio is lower than a ratio C2 stored in the threshold storage unit 14 (see step S12).

The above ratio C2 is a ratio of edge users to all terminal stations which belong to the cell, and is predetermined, for example, by a statistical investigation performed in advance.

When the edge user estimation unit 17 determines that the computed ratio is lower than the ratio C2 ("YES" in step S12), the edge user estimation unit 17 estimates all candidates (extracted by the candidate extraction unit 16) to be edge users (see step S13).

In contrast, when the edge user estimation unit 17 determines that the computed ratio is higher than or equal to the ratio C2 ("NO" in step S12), the edge user estimation unit 17 selects some of the candidates extracted by the candidate extraction unit 16, where the number of the selected candidates conforms to the ratio C2 for the terminal devices which belong to the cell of the present apparatus. The edge user estimation unit 17 estimates the selected candidates to be edge users (see step S14).

The candidate selection may be performed by random extraction from among the candidates; sequential extraction in order of the time during which the PHR information of each candidate is smaller than the threshold Th1, from the longest to the shortest; or sequential extraction in order of the average of the PHR information of each candidate, from the smallest to the largest.

When the candidate selection is performed by sequential extraction in order of (i) the time during which the PHR information of each candidate is smaller than the threshold Th1, from the longest to the shortest; or (ii) the average of the PHR information of each candidate, it can be said that the closer the transmission power of a terminal device, the higher the possibility that the terminal device is present in an end area of the cell. Therefore, it is possible to improve the accuracy for the edge user estimation.

When the candidate selection is performed by random extraction from among the candidates, the possibility that each terminal device having a relatively large PHR is determined to be an edge user can be equal to the possibility that each of the other candidates is determined to be an edge user.

As described above, in accordance with the present embodiment, the base station apparatus 1 performs the edge user estimation based on statistics for a population which is the PHR information stored time-series-sequentially in the PHR storage unit 13. In such a case, it is possible to reduce the influence of a temporary variation in the transmission power of each terminal device due to the transmission environment. Accordingly, it is possible to obtain the statistics for which an error due to a variation in the transmission power is reduced. Therefore, the edge user estimation based on such statistics can reduce erroneous determination for the edge user.

While an embodiment of the present invention have been described in detail with reference to the drawings, specific structures are not limited to those described above. Various design modifications or the like can be made without departing from the scope of the present invention.

In the above embodiment, the statistical processing unit 15 computes three types of statistics such as a time during which the PHR information is smaller than the threshold Th1; a value for the PHR information, which corresponds to the probability C1 for the cumulative distribution of the PHR; and an average of the PHR information during the time T2. The candidate extraction unit 16 extracts candidates for the edge user based on each statistic. However, this is not a limited condition.

For example, the candidates for the edge user may be extracted using only one of the above statistics.

Additionally, the statistical processing unit 15 may compute another type of value as a statistic for the PHR, and the candidate extraction unit 16 may extract the candidates for the edge user based on the relevant value.

Again in the present embodiment, although the edge user is determined using the statistics for the PHR, this is not a limited condition. For example, the edge user may be determined by computing the transmission power of each terminal device, as follows.

In step S4, the statistical processing unit 15 defines a population which is transmission power information stored time-series-sequentially, and computes a time during which the transmission power is higher than a predetermined threshold.

In the next step S5, the candidate extraction unit 16 extracts each terminal device as a candidate for the edge user, for which the time computed by the statistical processing unit 15 is longer than a predetermined time.

In the next step S6, the statistical processing unit 15 defines a population consisting of the transmission power information stored time-series-sequentially, and computes a cumulative distribution function which indicates a relationship between each transmission power value and a probability that transmission power information higher than or equal to the relevant value appears.

In the next step S7, the statistical processing unit 15 computes a probability that transmission power information higher than or equal to a predetermined threshold appears. Next, the candidate extraction unit 16 extracts each terminal device as a candidate for the edge user, for which the probability computed by the statistical processing unit 15 is higher than a predetermined probability.

Additionally, in step S9, the statistical processing unit 15 computes an average of the transmission power information during a predetermined time.

In the next step S10, the candidate extraction unit 16 extracts each terminal device as a candidate for the edge user, for which the average computed by the statistical processing unit 15 is higher than a predetermined threshold.

The above-described base station apparatus 1 includes a computer system. The operation of each above-described unit is stored as a program in a computer-readable storage medium, and the operation is performed when the relevant computer loads and executes the program.

The above computer readable storage medium is a magnetic disk, magneto optical disk, CD-ROM, DVD-ROM, semiconductor memory, or the like. In addition, the relevant computer program may be provided to a computer via a communication line, and the computer which received the program may execute the program.

In addition, the program may execute a part of the above-explained functions, or may be a program (so-called "differential program") by which the above-described functions can be executed by a combination of this program and an existing program which has already been stored in the relevant computer system.

INDUSTRIAL APPLICABILITY

In accordance with the present invention, it is possible to reduce the influence of a temporary variation in the transmission power of each terminal device due to the transmission environment. In addition, edge user estimation based on the statistics can reduce erroneous determination for the edge user.

REFERENCE SYMBOLS

1 base station apparatus
11 reception unit
12 registration unit
13 PHR storage unit
14 threshold storage unit
15 statistical processing unit
16 candidate extraction unit
17 edge user estimation unit

The invention claimed is:

1. A base station apparatus that estimates whether or not each terminal device belonging to a communication cell of the present apparatus is present in an end area of the cell, wherein the apparatus comprises:
   a reception device that receives from each terminal device, transmission power information which indicates transmission power of the terminal device;
   a registration device that successively registers the transmission power information with a storage device;
   a statistical processing device that computes a statistic used for estimating the terminal device present in the end area of the communication cell, with respect to a population which is the transmission power information stored in the storage device;
   a candidate extraction device that extracts candidates for the terminal device present in the end area of the communication cell, based on the statistic computed by the statistical processing device; and
   an estimation device that estimates the terminal device present in the end area of the communication cell from among the candidates extracted by the candidate extraction device;
   wherein the transmission power information is a "Power Headroom Report", abbreviated as PHR, which indicates a difference between currently transmitted power and the maximum transmission power of the terminal device.

2. The base station apparatus in accordance with claim 1, wherein:
   the statistical processing device computes a time during which the transmission power of the terminal device is higher than a predetermined transmission power; and
   the candidate extraction device extracts each terminal device, for which the time computed by the statistical processing device is longer than a predetermined time, as a candidate for the terminal device present in the end area of the communication cell.

3. The base station apparatus in accordance with claim 1, wherein:
   the statistical processing device computes a cumulative distribution for the transmission power of the terminal device, and obtains a transmission power having a predetermined value in the cumulative distribution; and
   the candidate extraction device extracts each terminal device, for which the transmission power obtained by the statistical processing device is higher than a predetermined transmission power, as a candidate for the terminal device present in the end area of the communication cell.

4. The base station apparatus in accordance with claim 1, wherein:
   the statistical processing device computes an average of the transmission power of the terminal device during a predetermined time; and
   the candidate extraction device extracts each terminal device, for which the average obtained by the statistical processing device is higher than a predetermined transmission power, as a candidate for the terminal device present in the end area of the communication cell.

5. The base station apparatus in accordance with claim 1, wherein:
   the estimation device computes an occupation ratio of the candidates extracted by the candidate extraction device to all terminal devices belonging to the communication cell;

when the ratio is lower than or equal to a predetermined value, the estimation device estimates that all candidates are present in the end area of the communication cell; and when the ratio is higher than or equal to a predetermined value, the estimation device selects some of the candidates, the number of which conforms to a predetermined ratio for the terminal devices that belong to the communication cell, and the estimation device estimates that the selected candidates are present in the end area of the communication cell.

6. The base station apparatus in accordance with claim 5, wherein:

when the ratio of the candidates extracted by the candidate extraction device to all terminal devices belonging to the communication cell is higher than or equal to a predetermined value, the estimation device randomly selects said some of the candidates, the number of which conforms to the predetermined ratio, and the estimation device estimates that the selected candidates are present in the end area of the communication cell.

7. The base station apparatus in accordance with claim 2, wherein:

the estimation device computes an occupation ratio of the candidates extracted by the candidate extraction device to all terminal devices belonging to the communication cell;

when the ratio is lower than or equal to a predetermined value, the estimation device estimates that all candidates are present in the end area of the communication cell; and when the ratio is higher than or equal to a predetermined value, the estimation device selects some of the candidates in order of the time, which is computed by the statistical processing device and during which the transmission power is higher than the predetermined power, from the longest to the shortest, where the number of the selected candidates conforms to a predetermined ratio for the terminal devices that belong to the communication cell, and the estimation device estimates that the selected candidates are present in the end area of the communication cell.

8. The base station apparatus in accordance with claim 4, wherein:

the estimation device computes an occupation ratio of the candidates extracted by the candidate extraction device to all terminal devices belonging to the communication cell;

when the ratio is lower than or equal to a predetermined value, the estimation device estimates that all candidates are present in the end area of the communication cell; and when the ratio is higher than or equal to a predetermined value, the estimation device selects some of the candidates in order of the average of the transmission power, which is computed by the statistical processing device, from the largest to the smallest, where the number of the selected candidates conforms to a predetermined ratio for the terminal devices that belong to the communication cell, and the estimation device estimates that the selected candidates are present in the end area of the communication cell.

9. An edge user estimation method using a base station apparatus, which estimates whether or not each terminal device belonging to a communication cell of the present apparatus is an edge user present in an end area of the cell, wherein:

a reception device receives from each terminal device, transmission power information which indicates transmission power of the terminal device;

a registration device successively registers the transmission power information with a storage device;

a statistical processing device computes a statistic used for estimating the terminal device present in the end area of the communication cell, with respect to a population which is the transmission power information stored in the storage device;

a candidate extraction device extracts candidates for the terminal device present in the end area of the communication cell, based on the statistic computed by the statistical processing device; and an estimation device estimates the edge user from among the candidates extracted by the candidate extraction device;

wherein the transmission power information is a "Power Headroom Report", abbreviated as PHR, which indicates a difference between currently transmitted power and the maximum transmission power of the terminal device.

10. A non-transitory computer-readable storage medium that stores a program that makes a base station apparatus, which estimates whether or not each terminal device belonging to a communication cell of the present apparatus is present in an end area of the cell, operate as:

a reception device that receives from each terminal device, transmission power information which indicates transmission power of the terminal device;

a registration device that successively registers the transmission power information with a storage device;

a statistical processing device that computes a statistic used for estimating the terminal device present in the end area of the communication cell, with respect to a population which is the transmission power information stored in the storage device;

a candidate extraction device that extracts candidates for the terminal device present in the end area of the communication cell, based on the statistic computed by the statistical processing device; and an estimation device that estimates the terminal device present in the end area of the communication cell from among the candidates extracted by the candidate extraction device;

wherein the transmission power information is a "Power Headroom Report", abbreviated as PHR, which indicates a difference between currently transmitted power and the maximum transmission power of the terminal device.

* * * * *